United States Patent [19]

DeFazio

[11] Patent Number: 4,656,222
[45] Date of Patent: Apr. 7, 1987

[54] PREPARATION OF HIGH MOLECULAR WEIGHT POLYACRYLATES BY INVERSE EMULSION POLYMERIZATION

[75] Inventor: Charles A. DeFazio, Union, N.Y.

[73] Assignee: Celanese Corporation, Corpus Christi, Tex.

[21] Appl. No.: 734,521

[22] Filed: May 16, 1985

[51] Int. Cl.[4] .......................... C08F 2/32; C08F 20/06
[52] U.S. Cl. .................................. 524/801; 524/762; 524/773; 524/831; 524/832; 526/307.6; 526/317.1; 526/932
[58] Field of Search ............ 526/207, 210, 236, 307.6, 526/317, 216, 240, 311, 317.1; 523/337; 524/762, 773, 801, 831, 832

[56] References Cited

U.S. PATENT DOCUMENTS

| 3,336,270 | 8/1967 | Monagle | 526/236 X |
| 3,509,113 | 4/1970 | Monagle et al. | 526/307.6 X |
| 4,115,339 | 9/1978 | Restaino | 524/831 X |
| 4,340,706 | 7/1982 | Obayashi et al. | 526/207 |

Primary Examiner—Joseph L. Schofer
Assistant Examiner—F. M. Teskin
Attorney, Agent, or Firm—D. R. Cassady

[57] ABSTRACT

Water soluble salts of acrylic acid are polymerized and co-polymerized with acrylamide by an inverse emulsion polymerization in a water/hydrocarbon emulsion without catalyst to yield high molecular weight polymers.

4 Claims, No Drawings

PREPARATION OF HIGH MOLECULAR WEIGHT POLYACRYLATES BY INVERSE EMULSION POLYMERIZATION

BACKGROUND OF THE INVENTION

Monagle et al., in U.S. Pat. No. 3,336,269, and U.S. Pat. No. 3,509,113, discuss the precipitation process for the manufacture of polyacrylamides from a solvent mixture of acetone-water or tert. butanol-acetone-water. The invention disclose that, as known in the art, free radical polymerization reactions are carried out in the substantial absence of oxygen which is accomplished by nitrogen displacement. They also indicate that, although such reactions can occur in the absence of a polymerization initiator, such an initiation is preferred; with 0.05 to 0.2% of initiator as the preferred concentration.

Kim, in U.S. Pat. No. 3,872,063, discloses the aqueous polymerization of acrylic acid type monomers with a sorbitol or equivalent bisulfite polymerization catalyst in an inert atmosphere such as in argon or nitrogen for from 0.5 to 25 hours to manufacture a polymer of about 6 million apparent molecular weight.

Volk and Hamlin, in U.S. Pat. No. 3,658,772 also disclose the aqueous polymerization of acrylic acid type monomers. In this patent the products are copolymers of acrylic acid and acrylamide manufactured in aqueous solution in the presence of a free-radical polymerization initiator at about pH 1 to about pH 3.2. The pH of the solution is said to be critical to the success of the reaction.

Glavis, in U.S. Pat. No. 3,058,958, discloses the polymerization of sodium and calcium salts of acrylic acid on a heated surface of at least above 100° C.

Ballast, in U.S. Pat. No. 3,509,114, claims the polymerization of acrylic monomers in aqueous solution containing at least 1% of an alkali metal chloride.

None of the cited references provide a method of manufacturing a linear acrylic acid polymer of over 20,000,000 molecular weight.

SUMMARY OF THE INVENTION

This invention relates to a method for the manufacture of homopolymers of acrylic acid and its salts and copolymers of acrylic acid and its salts with acrylamide. Such homopolymers and copolymers manufactured by the method of this invention have molecular weights well over 20,000,000. This invention also pertains to the polymers manufactured by the process of the invention.

The compositions of this invention are useful in water clarification, as aqueous thickeners, and for fracturing in drilling operations. Other uses for the compositions are obvious to those skilled in the art. Many of the uses are shared with the polyacrylamides but avoid the neurotoxicity of the polyacrylamides.

The polymerization process of the present invention is characterized as an inverse emulsion polymerization of a water soluble salt of acrylic acid alternatively containing up to 80% acrylamide.

By the process of the present invention, the acrylic acid-containing starting material is dissolved in a purified hydrocarbon solution and the acid is slightly over neutralized by the addition of an aqueous solution of an alkali metal or ammonium hydroxide; the resulting mixture is swept free of oxygen or other polymerization inhibitors by inert gas displacement; then sufficient acrylic acid is added to neutralize the excess base and to provide about a 90:10 to about a 99:1 by weight salt-acid ratio. Reaction then occurs spontaneously at temperatures above about 0° C. to about 35° C. to provide a clear dispersion of polymer in about 3 to about 5 hours.

The polymer has an apparent molecular weight of above 20 MM as determined by the method hereinbelow described. The polymers can be used as the hydrocarbon emulsion thereof or can be isolated by precipitation. Precipitation is accomplished by adding the emulsion to a large quantity of a lower alkyl alcohol or di-lower alkyl ketone and filtration and drying of the resulting precipitate.

DETAILED DESCRIPTION OF THE INVENTION

The present invention provides an improved method for the manufacture of a water soluble homopolymer of acrylic acid and its copolymers with up to 80% acrylamide of high molecular weight and the polymers manufactured thereby. The compositions of the invention are characterized by their high molecular weight, their high linearity, their high water solubility, and the ease of use of the polymer in the medium of manufacture without isolation or purification, if desired.

By the method of this invention an acrylic acid, preferrably purified glacial acrylic acid or a mixture of acrylic acid and up to 80% acrylamide is dissolved in a mixture of alkanes characterized by having a molecular weight of from about 150 to about 200 and a boiling range of from about 150° C. to about 250° C. containing a non-ionic surfactant.

In order to obtain the highest molecular weight polymer, the monomer to hydrocarbon to surfactant ratio of about 1:1.5:0.5 by weight is needed.

The mixture is cooled during mixing and subsequently over-neutralized slightly above stoichiometry to prevent spurious polymerization.

Neutralization is accomplished by the addition of a sufficient amount of an aqueous solution of an alkali metal hydroxide or ammonium hydroxide, bicarbonate or carbonate to form the alkali metal or ammonium salt of the acylic acid. It is critical that not only is all of the acylic acid neutralized, but that a slight excess of the aqueous alkali solution is added to ensure over-neutralization.

The water to hydrocarbon ratio in the resulting emulsion is critical to the result and should be between about 0.70 and 0.90, preferably between about 0.75 and 0.80.

Below a water to hydrocarbon ratio of about 0.70 no polymerization occurs and at above about 0.90 a substantially lower molecular weight polymer is obtained similar to the polymer molecular weights obtained by the prior art references cited above.

Air or oxygen displacement in the resulting emulsion is then begun, as for example, by purging or sparging with an inert gas i.e., nitrogen, argon, or the like.

The end point of the sparging operation is dependent upon the volume of the reaction mixture, the temperature of the emulsion and the sparging gas and is well within the skill of the artisan. During sparging and the ensuing polymerization, it is desirable to keep the solution and atmosphere above the solution free of oxygen by continuing the gaseous purge at low gas input levels. Such care to prevent oxyqen contamination prevents the intrusion of chain terminators and allows for very long linear polymers to be formed.

Sufficient acrylic acid is then added to the emulsion to provide a salt to acid ratio of from about 90:10 to about 99.9:0.1 by weight, preferrably from abut 98:2 to about 99:1 by weight, and the polymerization allowed to occur. The reaction can be held at ice bath temperatures or can be raised to about 35° C. Temperatures above 50° C. are to be avoided to insure the highest molecular weight polymer.

As polymerization occurs, the mixture appears to clear and become completely clear at the completion of the reaction.

The water clear inverse emulsion can be used as it is or the polymer can be isolated and purified.

Purification is accomplished by pouring the polymer-hydrocarbon mixture into a low molecular weight organic solvent for the hydrocarbon, surfactant, and water; i.e., acetone, methyl ethyl ketone, methanol, ethanol, isopropanol or the like. The solid polymer settles and the solvents can be removed by decantation, filtration or like mechanical separative means.

Surfactants useful for the method of this invention are the non-ionic, oil-soluble surfactants, as for example the alkyl and dialkyl phenoxy (polyalkoxy) alcohols, sorbitan monostearate, sorbitan monooleate, poly ethoxylates (2-5) of $C_8$ to $C_{12}$ alkyl alcohols, and the like.

Alkali metal hydroxides useful in the method of this invention can include sodium hydroxide, potassium hydroxide, and the like.

It is to be considered within the scope of this invention that small amounts of an alkali metal halide, as for example, sodium chloride can be added to the reaction emulsion.

The polymerized salt of acrylic acid and acrylic acid containing acrylamide can be acidified to the free acid by titration of the salt with a mineral acid as, for example, sulfuric acid, hydrocloric acid, hydrobromic acid, or the like. The free polymeric acid can then be separated from the acqueous salt solution by adding an appropriate amount of a water miscible organic material as for example methanol, acetone, methyl ethyl ketone, ethanol, isopropanol, or the like. The solid polymer settles and the solvents can be removed by decantation, filtration, or like mechanical separative means.

The apparent molecular weight of the polymer is determined by the following analytical technique adapted from that given in Polymer Handbook, 2nd Ed., Section IV-9, Edited by Bandrup and Immergut, John Wiley & Sons, New York, 1975.

The polymer, in the sodium salt form, 0.0400 g., is mixed into 100 ml. of 0.5 M aqueous sodium bromide. With slow stirring or swirling, complete solution is effected. Eight cubic centimeters of the 0.5 M NaBr is placed in a size 75 Cannon Ubbelohde brand or similar semi-micro dilution viscometer which is then allowed to equilibrate to 25° C. in a constant temperature bath. The flow time ($t_0$) in seconds is determined. The flow time determination is then repeated with the polymer soution ($t_{0.04}$) the polyer soution diluted by an equal volume of the 0.5 M NaBr (0.02), the polymer solution diluted with 1.5 time the volume of 0.5 M NaBr ($t_{0.016}$) and the polymer soution diluted with 3 times the volume of 0.5 M NaBr solution ($t_{0.01}$) The specific viscosities, nsp of the four solutions are calculated by the formula $[(t/t_0)-1]$ and the specific viscosities are plotted against concentration. The curve is extrapolated to zero concentration and the intercept is the intrinsic viscosity, $[\eta]$. The apparent molecular weight is then calculated by the formula $$M = \text{antilog} \frac{[\log [\eta] + 3.29585]}{0.656}$$

EXAMPLE 1

To a tared 1-liter, 4-necked flask where added Igepal DM-430 brand non-ionic surfactant, 55.0 parts; mixed $C_7$-$C_9$ fraction linear hydrocarbons, 170.0 parts; sodium chloride, 1.0 parts; deionized water, 76.0 parts; and glacial acrylic acid, 100.0 parts.

The reaction flask was mounted in the constant water bath with the agitator assembly, thermometer and reflux condenser then attached.

The contents were agitated slowly while neutralization of the glacial acrylic acid was made with 109.5 parts of aqueous NaOH (51.2%). A slow, subsurface sparge of prepurified nitrogen was carried out for two hours, making sure that the reaction flask and other attachments were tight and that out-gassing of nitrogen occured. After the 2 hours sparge, the nitrogen subsurface sparge was continued while heating to 35° C. After a total of 3 hours sparge, 3.1 g. glacial acrylic acid were added and the agitation and subsurface sparge continued. Within 3 hours, apparent solution was accomplished. The microemulsion of the polyacrylic acid was complete. The clear microemulsion was cooled to room temperature and discharged.

EXAMPLE 2

The procedure of Example 1 was followed exactly except that the following materials were substituted: Igepal DM-430 brand non-ionic surfactant, 55.0 parts; mixed $C_7$-$C_9$ fraction linear hydrocarbons, 170.0 parts; sodium chloride, 1.0 parts; deionized water, 76.0 parts; glacial acrylic acid, 30.0 parts; acrylamide, 70.0 parts.

The contents were agitated slowly while neutralization of the glacial acrylic acid was made with 32.9 parts of aqueous sodium hydroxide (51.2%). A slow, subsurface sparge of prepurified nitrogen was carried out for two hours, making sure that the reaction flask and other attachments were tight and that out-gassing of nitrogen occurred. After the two hour sparge, the nitrogen sparge was continued while heating to 35° C. After a total of 3 hours sparge, 1.0 g. of glacial acrylic acid was added and the agitation and subsurface sparge was continued. Within 3 hours, apparent solution was accomplished. The microemulsion of the polyacrylic acid--acrylamide was complete. The clear microemulsion was cooled to room temperature and discharged.

I claim:

1. A method for the manufacture of polymers of acrylic acid containing from 0% to 80% acrylamide which comprises:
   a. admixing the acrylic acid and acrylamide in a purified hydrocarbon solvent and non-ionic surfactant;
   b. slightly over-neutralizing the acrylic acid by the addition of an aqueous solution of an alkali metal hydroxide or ammonium hydroxide to provide an emulsion with a water to hydrocarbon ration of between about 0.70 and 0.90;
   c. displacing the air and oxygen in the over-neutralized solution of (b);
   d. adding sufficient acrylic acid to provide a salt to acid ratio of from about 90:10 to about 99.9:0.1;
   e. allowing polymerization to occur at below 50° C. in the absence of a catalyst.

2. The method of claim 1 wherein the acrylic acid, hydrocarbon, and surfactant are admixed in a ratio of about 1:1.5:0.5.

3. The method of claim 1 further comprising isolating the polymer formed in (e) by diluting the polymer hydrocarbon mixture with a solvent for the hydrocarbon, surfactant, and water and separating the solid polymer.

4. The method of claim 1 wherein the air and oxygen is displaced by sparging with an inert gas.

* * * * *